(12) United States Patent
Heinicke et al.

(10) Patent No.: US 9,770,718 B2
(45) Date of Patent: Sep. 26, 2017

(54) ROLLER MILL AND METHOD FOR MILLING BRITTLE MILLING MATERIAL

(71) Applicant: ThyssenKrupp Industrial Solutions GmbH, Beckum (DE)

(72) Inventors: Felix Heinicke, Munster (DE); Johann Knecht, Wadersloh (DE); Wolfgang Partsch, Beckum (DE); Johann Asneimer, Hamm (DE)

(73) Assignee: ThyssenKrupp Industrial Solutions AG (DE)

( * ) Notice: Subject to any disclaimer, the term of this patent is extended or adjusted under 35 U.S.C. 154(b) by 733 days.

(21) Appl. No.: 14/348,105

(22) PCT Filed: Sep. 21, 2012

(86) PCT No.: PCT/EP2012/068608
§ 371 (c)(1),
(2) Date: Mar. 28, 2014

(87) PCT Pub. No.: WO2013/045354
PCT Pub. Date: Apr. 4, 2013

(65) Prior Publication Data
US 2014/0239100 A1    Aug. 28, 2014

(30) Foreign Application Priority Data
Sep. 30, 2011   (DE) .......... 10 2011 054 086

(51) Int. Cl.
*B02C 4/02*        (2006.01)
*B02C 4/28*        (2006.01)

(52) U.S. Cl.
CPC ........... *B02C 4/02* (2013.01); *B02C 4/286* (2013.01)

(58) Field of Classification Search
CPC ................ B02C 4/286; B02C 4/02
(Continued)

(56) References Cited

U.S. PATENT DOCUMENTS 1,405,731 A * 2/1922 MacNicol .......... B65G 69/00
                                                       198/642
1,560,800 A   11/1925 Hoberecht
(Continued)

FOREIGN PATENT DOCUMENTS

AU      640 518 B2    11/1993
DE      35 15 673 A1  11/1986
(Continued)

*Primary Examiner* — Faye Francis
(74) *Attorney, Agent, or Firm* — Renner Kenner Greive Bobak Taylor & Weber

(57) ABSTRACT

A roller mill for crushing brittle material has two grinding rollers forming a grinding gap, and provides a delivery chute for feeding the material to the grinding gap. In the delivery chute at least one distributor device is arranged above a middle region of the grinding gap and extends above the grinding gap transversely to the longitudinal extent of the grinding gap and covers from 5 to 70% of the cross-section of the delivery chute. The material is delivered to the delivery chute and is crushed in the grinding gap, wherein the material is introduced into the delivery chute or is deflected in the delivery chute in such a manner that, based on the longitudinal extent of the grinding gap, coarser material accumulates in a middle region of the grinding gap than in the edge regions.

6 Claims, 4 Drawing Sheets

Figure 2:
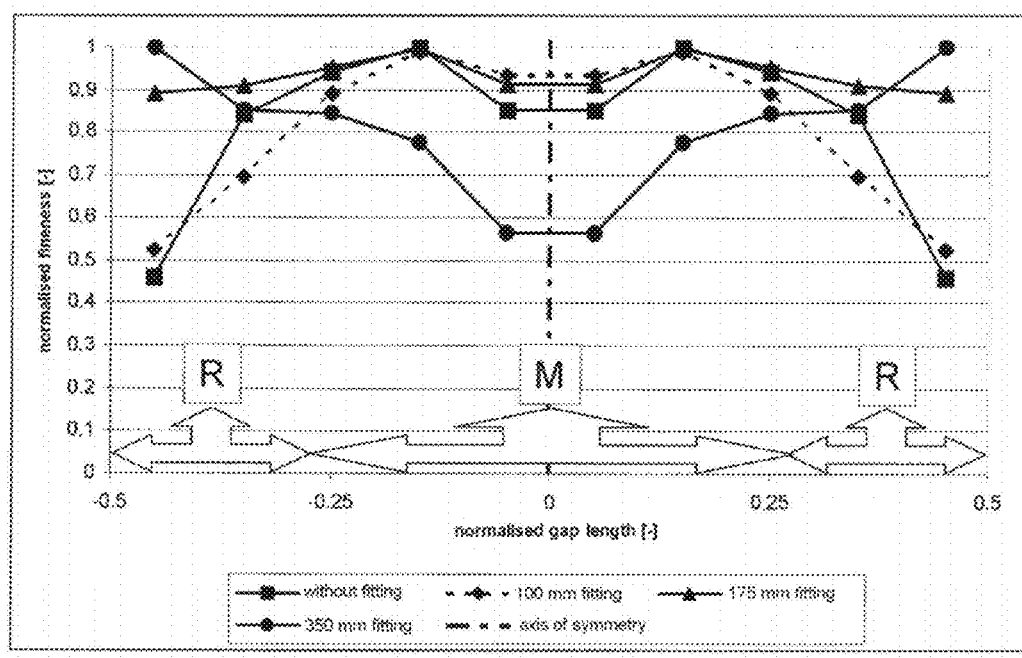

(58) Field of Classification Search
USPC .................................. 241/225, 235, 275
See application file for complete search history.

(56) References Cited

U.S. PATENT DOCUMENTS

| | | | | |
|---|---|---|---|---|
| 1,988,473 A * | 1/1935 | Bennett | ...................... | F23J 1/00 110/165 R |
| 2,502,087 A * | 3/1950 | Goldberg | ................. | B65B 1/14 141/237 |
| 2,550,872 A * | 5/1951 | Shaw | ..................... | A01C 17/00 111/11 |
| 3,056,293 A * | 10/1962 | Ofner | ........................ | G01F 1/30 73/198 |
| 3,074,657 A * | 1/1963 | Bridgewater | ....... | B02C 13/1828 241/275 |
| 3,640,136 A * | 2/1972 | Nolte | ........................ | G01F 1/30 73/861.73 |
| 3,945,532 A * | 3/1976 | Marks | ....................... | G01F 1/78 222/55 |
| 4,166,585 A * | 9/1979 | Alford | ................ | B02C 13/1835 241/275 |
| 4,357,287 A | 11/1982 | Schonert | | |
| 4,436,138 A * | 3/1984 | Kondo | ................ | B02C 19/0031 164/412 |
| 4,682,739 A * | 7/1987 | Sevelinge | .......... | B02C 13/1842 241/275 |
| 5,131,601 A * | 7/1992 | Okawa | ................ | B02C 13/1842 241/275 |
| 5,238,035 A * | 8/1993 | Poussin | .................... | B01J 8/002 141/286 |
| 5,366,170 A * | 11/1994 | Jones, Jr. | .................. | F27B 1/10 241/275 |
| 5,769,331 A * | 6/1998 | Yamagishi | .......... | B02C 19/0056 241/152.2 |
| 6,129,296 A * | 10/2000 | Campbell | ............... | B02C 4/286 241/225 |

FOREIGN PATENT DOCUMENTS

| | | |
|---|---|---|
| DE | 37 42 552 A1 | 7/1989 |
| DE | 39 06 295 A1 | 8/1990 |
| DE | 20 2010 009 151 U1 | 10/2010 |
| WO | 2009/007337 A1 | 1/2009 |

* cited by examiner

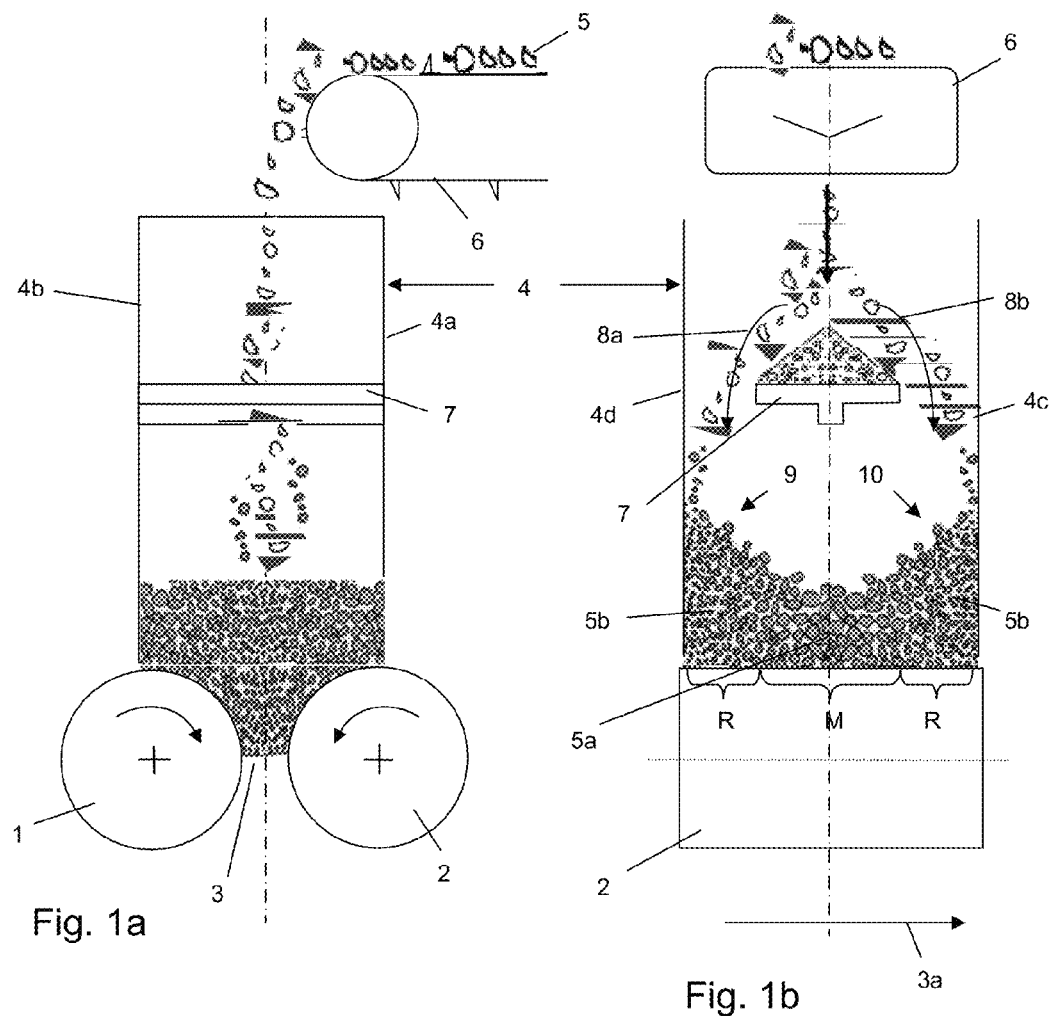
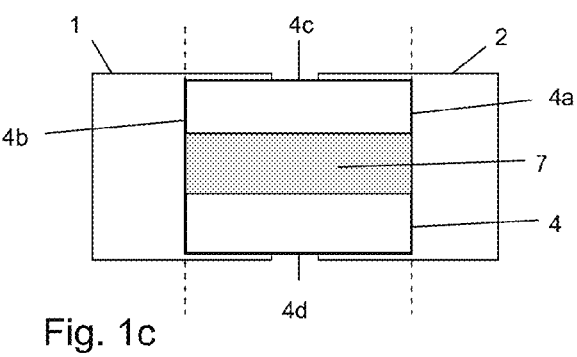
Fig. 1a
Fig. 1b
Fig. 1c

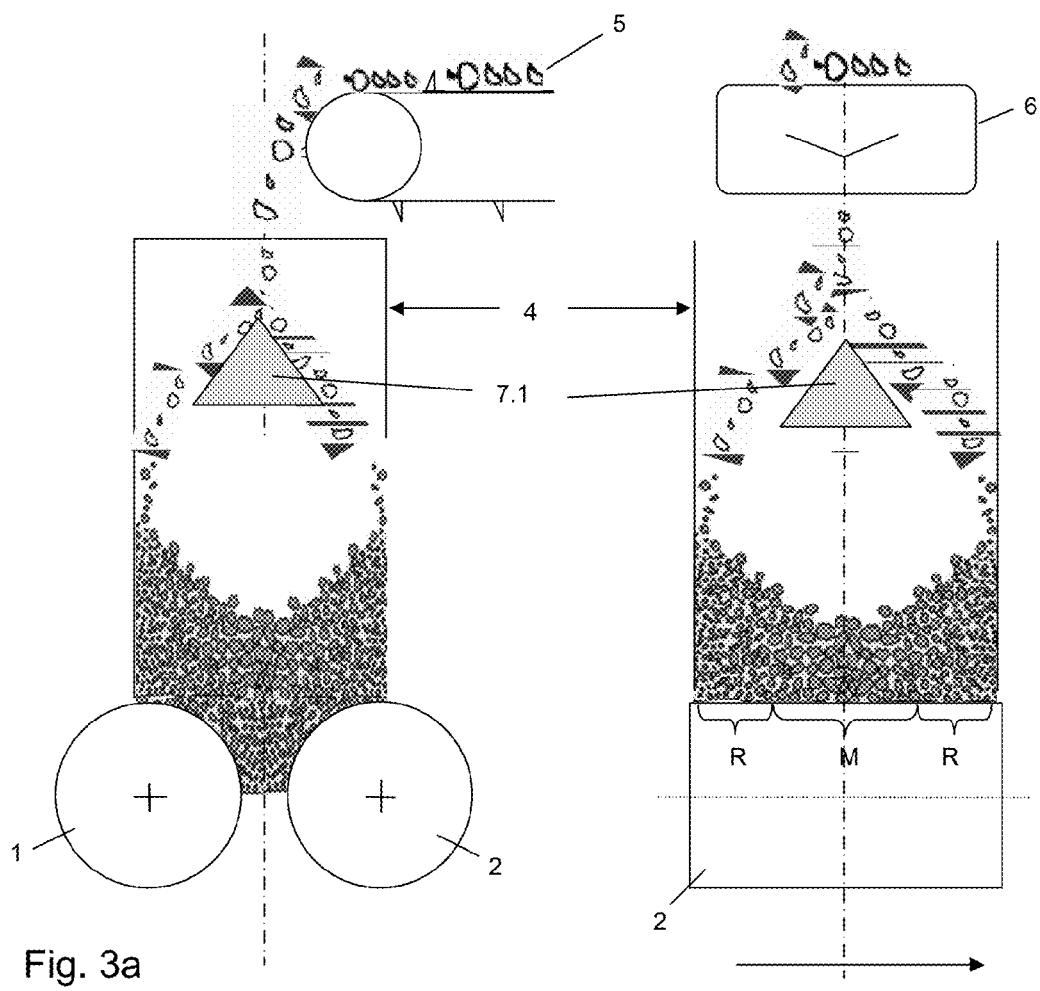
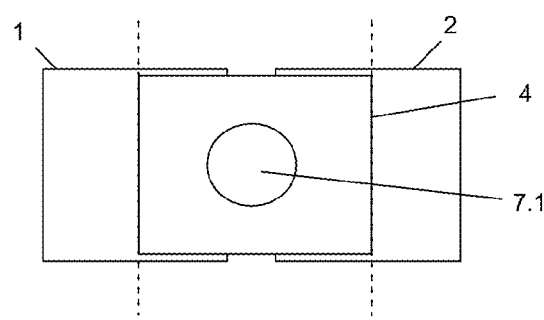
Fig. 3a
Fig. 3b
Fig. 3c

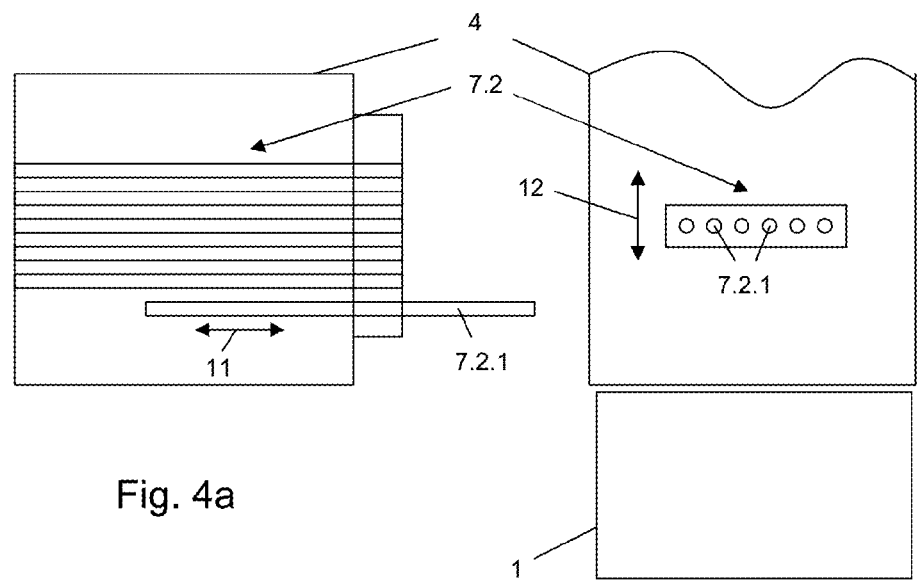
Fig. 4a
Fig. 4b
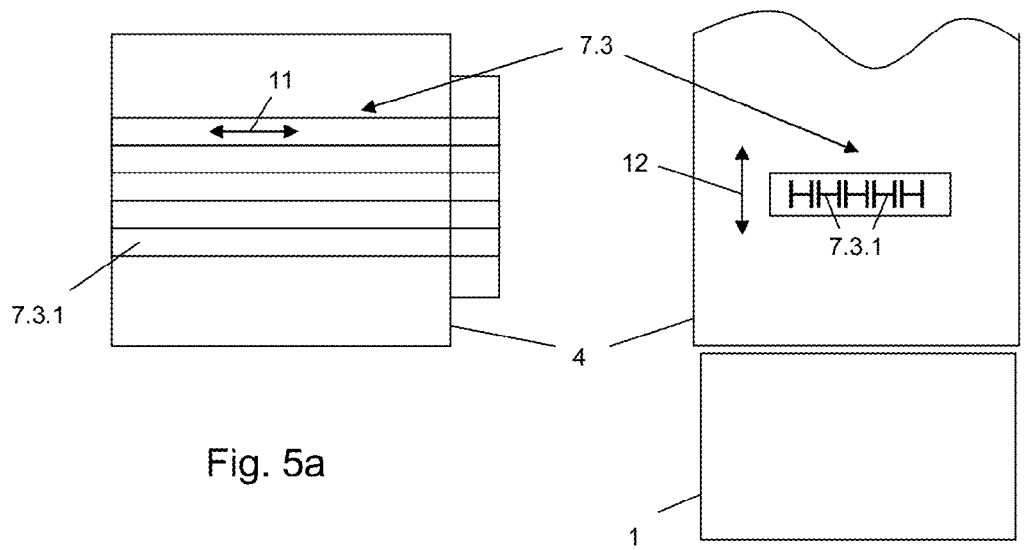
Fig. 5a
Fig. 5b

ROLLER MILL AND METHOD FOR MILLING BRITTLE MILLING MATERIAL

The invention relates to a roller mill and to a method for crushing brittle material for grinding of different grain sizes.

Roller mills, such as, for example, a material bed roller mill, comprise two driven grinding rollers which are arranged horizontally next to one another and which are pressed against one another with high pressure to form a grinding gap. The material for grinding that is to be crushed is largely crushed as it passes through the grinding gap, there being formed agglomerates (slugs) which already contain a large amount of finished product. Material bed roller mills of this type have become known in particular from DE 27 08 053 C3 and permit a considerable energy saving in the crushing of brittle material for grinding, such as, for example, cement clinker and the like.

The material for grinding is conventionally fed by way of a delivery chute. In order to avoid unnecessary wear of the grinding rollers, the delivery chute is mostly operated with a predetermined filling level. The material for grinding is discharged into the delivery chute of the continuously operated roller mill by way of a feed device, for example a belt conveyor, whereby a cone-shaped pile of loose material forms as a result of the filling level in the delivery chute. Since the material for grinding is usually present in different grain sizes, this cone-shaped pile of loose material results in so-called separation phenomena, so that, based on the axial length of the grinding gap, the material at the outer ends of the grinding gap is coarser than that in the middle. This special grain size distribution is regarded as inefficient, however.

A wide variety of distributor devices have therefore been proposed for distributing the material for grinding in the delivery chute. In DE 37 42 552 A1, the delivery chute is divided into a plurality of delivery chute cells, the outlet openings of which facing the grinding gap have a different position relative to the vertical centre plane of the material bed roller mill. According to DE 35 15 673 A1, a plurality of side walls which extend to the grinding gap were arranged in the grinding gap transversely to the longitudinal direction of the grinding gap, the intermediate walls having a decreasing height and the material for grinding passing into the individual part-chutes by the overflow principle.

In DE 39 06 295 A1 it has been proposed first to divide the material for grinding into at least two different grain fractions and then feed them by way of different regions of the delivery chute, whereby the coarser grain fraction was delivered predominantly to the inner region and the finer grain fraction predominantly to the outer region of the stream of roller material flowing to the grinding gap. Prior separation into the two grain fractions is relatively complex, however.

The problem underlying DE 20 2010 009 151 U1 is that the chute walls of the delivery chute prevent an even flow of material for grinding. It was therefore proposed to provide an opening which runs in the axial direction above the grinding gap and which has a shape tapered to the axial centre of the grinding gap. In this manner, the flow of material, which is impeded by the walls, is assisted by the larger opening in that region and thereby equalised.

The object underlying the invention is to increase the efficiency of the roller mill further and thereby reduce the energy required for crushing.

According to the invention, that object is achieved by the features of claims 1 and 8.

The achievement of the object was based in particular on the following findings:

The separation phenomena that occur owing to the cone-shaped pile of loose material in a filling-level-operated delivery chute have the result that the edge regions of the grinding gap are charged with coarser material than the middle region of the grinding gap. Furthermore, it has been found that, seen over the length of the grinding gap, the middle region permits more energy efficient crushing than the edge regions. It has therefore been found that it would be advantageous for more efficient crushing to be able to reverse the grain size distribution over the length of the grinding gap, so that the finer material for grinding tends to be provided at the outer edges and the coarser material for grinding tends to be provided in the middle region.

The roller mill according to the invention for the crushing of brittle material for grinding of different grain sizes has two grinding rollers which form between them a grinding gap, and provides a delivery chute for feeding the material for grinding to the grinding gap, wherein there is provided in the delivery chute at least one distributor device which is arranged above a middle region of the grinding gap and extends above the grinding gap transversely to the longitudinal extent of the grinding gap and covers from 5 to 70%, preferably from 10 to 55%, of the cross-section of the delivery chute.

According to the method according to the invention for crushing brittle material for grinding of different grain sizes, the material for grinding is delivered to a delivery chute and is crushed in a grinding gap formed between two grinding rollers, wherein the material for grinding is introduced into the delivery chute or is deflected in the delivery chute in such a manner that, based on the longitudinal extent of the grinding gap, coarser material for grinding accumulates in a middle region of the grinding gap than in the edge regions.

Unlike all previous efforts at distributing the material for grinding as evenly as possible over the length of the grinding gap, the present invention deliberately accepts the separation caused by the feeding of the material for grinding into the delivery chute, the material for grinding being so distributed by the distributor device, however, that, based on the longitudinal direction of the grinding gap, coarser material for grinding accumulates in a middle region of the grinding gap than in the edge regions. In this manner, the more energy efficient middle region can purposively be used for crushing the coarser material for grinding.

In the tests underlying the invention, it has been shown that an energy saving of up to 20% or more can be achieved with the material distribution according to the invention as compared with a conventional material distribution in which the coarser particles are present in edge regions and the finer particles in the middle region.

Further embodiments of the invention are the subject of the dependent claims.

According to a preferred embodiment of the invention, the distributor device is arranged transversely above a middle region of the grinding gap. It can extend in particular from one wall of the delivery chute to an opposite wall of the delivery chute. The distributor device can further be adjustable in terms of its width and/or its distance from the grinding gap.

There are a wide variety of possibilities for producing the distributor device. For example, it can consist of from 1 to 5 beams or it can be in the form of a needle pusher. A configuration of the distributor device as a cone arranged in a middle region of the delivery chute is also conceivable.

According to the method according to the invention, the material for grinding is introduced into the delivery chute or is deflected in the delivery chute in such a manner that there form in the delivery chute at least two cone-shaped piles of loose material which are located opposite one another in the direction of the longitudinal extent of the grinding gap, and the coarser material for grinding slides down to the middle region of the grinding gap.

It can further be provided that there is used in the delivery chute a distributor device for deflecting the material for grinding, wherein the width of the distributor device and/or the height of the distributor device above the grinding gap is adjusted in dependence on at least one operating parameter during operation of the roller mill.

The invention is explained in greater detail with reference to the following description of some exemplary embodiments and the drawing.

In the drawings

FIG. 1a is a first view of a roller mill according to a first exemplary embodiment, FIG. 1b is a second view of a roller mill according to a first exemplary embodiment, FIG. 1c is a second view of a roller mill according to a first exemplary embodiment, FIG. 2 shows a diagram of the effect on the fineness distribution via the grinding gap with different coverage of the cross-section of the delivery chute, FIG. 3a is a first view of a roller mill according to a second exemplary embodiment, FIG. 3b is a second view of a roller mill according to a second exemplary embodiment, FIG. 3c is a third view of a roller mill according to a second exemplary embodiment, FIG. 4a shows a top view of a delivery chute according to a third exemplary embodiment, FIG. 4b shows a side view of a delivery chute according to a third exemplary embodiment, FIG. 5a shows a top view of a delivery chute according to a fourth exemplary embodiment, and FIG. 5b shows a side view of a delivery chute according to a fourth exemplary embodiment.

The roller mill shown in FIG. 1a-1c has substantially two grinding rollers 1, 2, which form between them a grinding gap 3, and a delivery chute 4 for the feeding of material for grinding 5, which passes by way of a feed device 6, for example a belt conveyor, into the delivery chute 4.

The roller mill is, for example, a so-called material bed roller mill, in which the grinding rollers 1, 2 are pressed against one another with high pressure of, for example, 50 MPa to form the grinding gap 3. The material for grinding 5 that is to be crushed can be a mineral material having a grain size of, for example, up to 100 mm.

In order to ensure an even flow of material for grinding to the grinding gap 3, the material for grinding 5 is fed in such a manner that a specific filling level is always established in the delivery chute 4. This also has the result that wear of the grinding tools is reduced and a longer service life of the machine is thus achieved.

Above the material for grinding 5 located in the delivery chute 4 there is provided a distributor device 7, which extends above the grinding gap 3 transversely to the longitudinal extent thereof and, in the exemplary embodiment shown, extends in the form of a T-beam from one wall 4a to an opposite wall 4b of the delivery chute 4.

The distributor device is here arranged in a middle region M.

The material for grinding 5 strikes the distributor device 7 as a stream of material 8 and is there divided into two part-streams 8a, 8b (see FIG. 1b). A small layer of material thereby forms on the distributor device 7, which at the same time serves as wear protection. In this manner, opposing cone-shaped piles of loose material 9, 10 form at the opposing walls 4c and 4d that delimit the delivery chute 4 in the longitudinal extent of the grinding gap 3. In the case of material for grinding having different grain sizes, cone-shaped piles of loose material have the property that the coarser material for grinding 5a tends to accumulate at the foot of the cone-shaped pile of loose material and the finer material for grinding 5b accumulates further up. In order to obtain more of the coarser material for grinding in the middle region M of the grinding gap, the invention purposively utilises the separation behaviour of cone-shaped piles of loose material. However, it is crucial that the distributor device is on the one hand arranged transversely to the longitudinal extent of the grinding gap and covers part of the cross-section of the delivery chute, the tests underlying the invention having shown a coverage of from 5 to 70%, preferably from 10 to 55%, to be advantageous. Although the effect can still be achieved with greater coverage, the material flow is in some cases impeded to such an extent that a predetermined filling level can no longer reliably be maintained.

In the diagram according to FIG. 2, the normalised gap length is plotted against the normalised fineness. The gap length "0" denotes exactly the middle in the longitudinal extent 3a of the grinding gap 3. In the case of the normalised fineness, the material is all the finer, the closer the value to 1 and all the coarser, the smaller the value. In the diagram, four grain distributions have been shown, which were obtained by distributor devices of different widths. It can very clearly be seen that, without the use of a distributor device 7, the coarser material accumulates to a greater extent in the edge regions R and the finer material in the middle region M of the grinding gap 3. By means of an increasingly wider distributor device 7 it can be seen that the grain size distribution in the case of a distributor device having a width of 350 mm is almost reversed, the finer material for grinding being present in the edge regions R and the coarser material for grinding in the middle region M of the grinding gap. The width of 350 mm corresponded to a coverage of the cross-section of the delivery chute 4 of approximately 43%.

The required coverage of the delivery chute by the distributor device, and also the height of the distributor device 7 above the grinding gap, are dependent significantly on the material for grinding 5 that is to be crushed. It may therefore be advantageous to be able to adjust the width of the distributor device 7 and also its distance from the grinding gap and optionally to be able to make appropriate adjustments even during operation. It is wholly conceivable for such an adjustment to be made manually or automatically in dependence on an operating parameter, such as, for example, the smoothness of the plant, the energy consumption of the drive motors of the grinding rollers or the throughput.

FIG. 3a-3c show a second exemplary embodiment, in which the distributor device 7.1 is formed by a cone. This embodiment has the advantage that the coarser material for grinding is guided into the middle from all sides. However, slightly more complex mounting of the cone in the middle of the delivery chute 4 must be accepted, as compared with the first exemplary embodiment.

Two further exemplary embodiments are shown hereinbelow with reference to FIGS. 4a and 4b and FIGS. 5a and 5b, which exemplary embodiments additionally permit an adjustment of the width and also of the height of the distributor device. In FIGS. 4a and 4b, the distributor device 7.2 is in the form of a needle pusher, wherein the rod-shaped elements 7.2.1 can be guided into or out of the delivery chute 4 individually (double arrow 11) in order thus to be able to adjust the width of the distributor device. The mechanics required therefor are sufficiently well known from the prior art and will therefore not be discussed in greater detail. Moreover, it is also possible to provide a suitable device for changing the distance of the distributor device 7.2 relative to the grinding gap 3 (see double arrow 12).

In the exemplary embodiment according to FIGS. 5a and 5b, a distributor device 7.3 is shown which comprises a plurality of H-shaped beams 7.3.1, which can likewise be pushed into or out of the delivery chute 4 individually or together in order thus to adjust the width of the distributor device 7.3. Owing to the H-shaped form of these beams, material for grinding 5 is able to accumulate in the channels, which are open to the top, and then forms an autogenous wear protection for the distributor device.

Instead of the distributor devices arranged in the delivery chute 4, it would in principle also be conceivable to form two cone-shaped piles of loose material located opposite one another in the direction of the longitudinal extent of the grinding gap by means of two suitably positioned feed devices which introduce the material for grinding into the delivery chute in such a manner that, based on the longitudinal extent of the grinding gap, coarser material for grinding accumulates in the middle region M of the grinding gap than in the edge regions R.

Owing to the distribution according to the invention of the coarser and finer fraction of the material for grinding along the grinding gap 3, the more energy efficient middle region M can purposively be used for crushing the coarser material for grinding, as a result of which substantially more efficient crushing is possible.

The invention claimed is:

1. Roller mill for crushing brittle material for grinding of different grain sizes, having two grinding rollers which form between them a grinding gap, and a delivery chute for feeding the material for grinding to the grinding gap, wherein there is provided in the delivery chute at least one distributor device,
    wherein the distributor device is arranged above a middle region (M) of the grinding gap and wherein the distributor device is selected from of a plurality of beams and a needle pusher, and the distributor device extends above the grinding gap transversely to the longitudinal extent of the grinding gap and covers from 5 to 70% of the cross-section of the delivery chute, wherein the cross section of the chute is measured along the longitudinal extent of the grinding gap, such that the distributor device receives material for grinding and divides and deflects the material for grinding in opposite longitudinal directions relative to the longitudinal extent of the grinding gap.

2. Roller mill according to claim 1, characterised in that the distributor device covers from 10 to 55% of the cross-section of the delivery chute.

3. Roller mill according to claim 1, characterised in that the distributor device extends from one wall of the delivery chute to an opposite wall of the delivery chute.

4. Roller mill according to claim 1, characterised in that the distributor device is adjustable in terms of its width and/or the distance of the distributor device from the grinding gap.

5. Method for crushing brittle material for grinding of different grain sizes, the method comprising the steps of:
    delivering material for grinding to a delivery chute including a at least one distributor device therein, the distributor device arranged above a middle region (M) of the grinding gap formed between two grinding rollers, and the distributor device extending above the grinding gap transversely to the longitudinal extent of the grinding gap and covering from 5 to 70% of the cross-section of the delivery chute;
    deflecting the material for grinding with the distributor device thereby forming in the delivery chute at least two cone-shaped piles of loose material which are located opposite one another in the direction of the longitudinal extent of the grinding gap, and the coarser material for grinding slides down to the middle region (M) of the grinding gap and based on the longitudinal extent of the grinding gap, coarser material for grinding accumulates in a middle region (M) of the grinding gap more than in the edge regions (R); and
    crushing the material for grinding in the grinding gap.

6. Method according to claim 5, wherein the width of the distributor device and/or the height of the distributor device above the grinding gap is adjusted in dependence on an operating parameter during operation of the roller mill, the operating parameter being selected from the group consisting of smoothness of the roller mill, energy consumption of drive motors of the grinding rollers, and throughput.

* * * * *